Aug. 18, 1925.
T. G. RENNERFELT
SELF LOCKING NUT
Filed Aug. 18, 1924
1,550,282
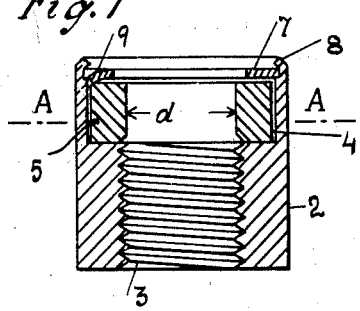
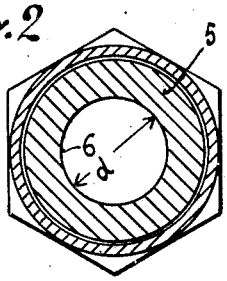
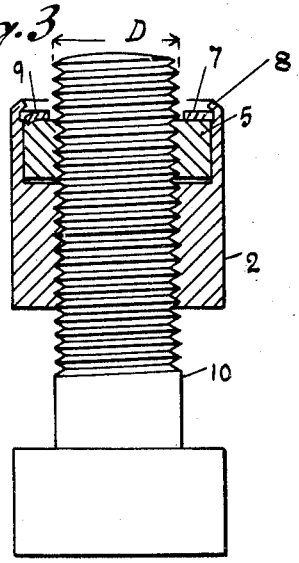
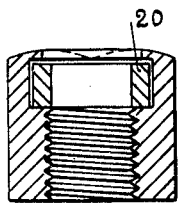
INVENTOR
Ture Gustaf Rennerfelt Patented Aug. 18, 1925.

1,550,282

UNITED STATES PATENT OFFICE.

TURE GUSTAF RENNERFELT, OF STOCKHOLM, SWEDEN.

SELF-LOCKING NUT.

Application filed August 18, 1924. Serial No. 732,705.

*To all whom it may concern:*

Be it known that I, TURE GUSTAF RENNERFELT, citizen of Sweden, and resident of Stockholm, in the county of Stockholm and Kingdom of Sweden, have invented certain new and useful Improvements in Self-Locking Nuts, of which the following is a specification.

My invention relates to improvements in selflocking nuts. The object of the invention is to provide a nut which shall be selflocking in any position on the screw upon which it is threaded so that the nut shall not become loosened by vibration and shaking. On the other hand it shall offer no undue resistance to loosening when desired, and it shall require for its handling no other tool than an ordinary wrench.

To gain this object I construct my improved nut partly of metal such as iron, and partly of non metallic elastic material such as rubber or fibre, the metallic part being threaded in ordinary manner, and the other part being not threaded but arranged—
when applied to the screw—to become impressed by the screw with a thread which fits tightly and perfectly around the thread of the screw so that there shall be no loose play between the nut and the screw.

My invention is illustrated in the accompanying drawings, in which Fig. 1 is a longitudinal section of such a nut. Fig. 2 is a cross section on the line A—A of Fig. 1. In Fig. 3 the same nut is shown as applied to a screw. Fig. 4 illustrates a detail. Fig. 5 shows a modification of the nut. In the drawings 2 denotes a body of iron or other metal formed with threads 3, and with a cavity 4 in which is placed a cushion 5 of non metallic elastic material such as rubber or flexible fibre. The cushion is formed as a disk or ring with a cylindrical or slightly tapering hole 6, and is retained within the body by the washer 7 over which the edge 8 of the body 2 is bent or pressed. The washer 7 may be formed with a tooth or depression 9 arranged to engage the edge of the disk 5 so as to prevent it from turning relatively to the body. The diameter D of the hole 6 is smaller than the diameter D of the screwbolt 10 for which the nut is intended. When the threaded part of the nut is screwed onto the bolt as shown in Fig. 3 the cushion becomes pressed against the washer, and the bolt will be forced into the narrow hole 6 so that the elastic cushion becomes impressed by the bolt with a thread which fits perfectly around the thread of the bolt without any loose play. At the same time the cushion will expand to some extent, and will exert on the bolt an elastic pressure uniformly around its circumference. Since the nut fits without play on the screw 10, the nut cannot vibrate out of harmony with the screw when they become subjected to shaking, and the pressure exerted by the cushion will prevent the nut from turning. When desired the nut can be removed with a wrench like an ordinary nut. In case of unusually large play between the threads of the body 2 and of the screw, a solution of rubber may be applied on the threads, so that after evaporation a layer of rubber will remain, and adhere to the threads of the body and of the screw. In Fig. 5 the cushion is shown as a rubber ring 20. Instead of rubber or fibre I can use guttapercha, balata, cork or fibrous elastic material.

Having thus described my invention, what I claim as an article of manufacture is:—

1. The combination of a metallic body formed at one end with threads and at its other end with a cavity, and arranged to be threaded onto a screw, a cushion of non metallic elastic material formed with a hole of smaller diameter than the diameter of the screw placed into the cavity, and means for retaining the cushion within the cavity against the pressure of the screw, the threads arranged to force the screw into the hole so as to impress a thread into the cushion.

2. The combination of a threaded metallic body formed at one end with a cavity and arranged to be threaded onto a screw, and a cushion of non metallic elastic material formed with a hole of smaller diameter than the diameter of the screw retained within the cavity, the threads of the body arranged to force the screw into the hole so as to impress a thread upon the cushion, space being provided within the body to permit the cushion to become expanded by the screw.

3. The combination of a threaded metallic body formed at one end with a cavity and arranged to be threaded onto a screw, a cylindrical ring of non metallic elastic material formed with a hole of smaller diameter than the diameter of the screw retained within the cavity, and means within the body for preventing the ring from turning relatively to the body, the threads of the body arranged to force the end of the screw into the hole so as to impress a thread into the ring.

4. The combination of a threaded metallic body formed at one end with a cavity and arranged to be threaded onto a screw, a cushion of non metallic elastic material formed with a hole of smaller diameter than the diameter of the screw placed within the cavity, and a washer in contact with the cushion fastened to the body, the threads of the body being arranged to force the screw into the hole so as to impress a thread into the cushion.

5. The combination of a threaded metallic body of hexagonal cross section arranged to act as a nut and formed at one end with a cavity, a cushion of fibrous elastic material within the cavity, and a washer within the cavity in contact with the cushion, the edge of the body bent over the washer, and the said edge being formed cylindrical for the purpose of facilitating its bending over the washer.

Signed at Stockholm in the county of Stockholm and Kingdom of Sweden, this 5th day of August, A. D. 1924.

TURE GUSTAF RENNERFELT.